United States Patent
Jones et al.

(10) Patent No.: US 7,328,493 B2
(45) Date of Patent: Feb. 12, 2008

(54) SELF RESTRAINED FITTING FOR PVC AND DUCTILE IRON PIPE

(75) Inventors: Jim Jones, Aledo, TX (US); Bradford G. Corbett, Jr., Fort Worth, TX (US)

(73) Assignee: S & B Technical Products, Inc., Fort Worth, TX (US)

( * ) Notice: Subject to any disclaimer, the term of this patent is extended or adjusted under 35 U.S.C. 154(b) by 106 days.

(21) Appl. No.: 11/149,988

(22) Filed: Jun. 10, 2005

(65) Prior Publication Data
US 2006/0279080 A1 Dec. 14, 2006

(51) Int. Cl.
*B23P 19/02* (2006.01)
*F16L 17/00* (2006.01)

(52) U.S. Cl. .................... 29/525; 29/521; 285/374

(58) Field of Classification Search .......... 29/525, 29/521, 506, 520; 285/104, 232, 374, 307, 285/332.2, 339
See application file for complete search history.

(56) References Cited

U.S. PATENT DOCUMENTS

| | | | | |
|---|---|---|---|---|
| 4,011,652 A | * | 3/1977 | Black | 29/455.1 |
| 4,229,026 A | * | 10/1980 | Seiler | 285/105 |
| 4,466,640 A | * | 8/1984 | Van Houtte | 285/104 |
| 4,712,809 A | * | 12/1987 | Legris | 285/21.1 |
| 4,735,442 A | * | 4/1988 | Burli | 285/148.13 |
| 4,863,199 A | * | 9/1989 | Hojo et al. | 285/232 |
| 5,037,144 A | * | 8/1991 | Peting et al. | 285/321 |
| 5,067,751 A | | 11/1991 | Walworth et al. | 285/105 |
| 5,269,569 A | * | 12/1993 | Weber et al. | 285/104 |
| 5,295,697 A | | 3/1994 | Weber et al. | 277/181 |
| 5,464,228 A | | 11/1995 | Weber et al. | 277/207 |
| 5,951,058 A | * | 9/1999 | Dickinson et al. | 285/21.2 |
| 6,450,553 B1 | * | 9/2002 | Suresh | 285/382 |
| 6,502,867 B2 | | 1/2003 | Holmes, IV et al. | 285/337 |
| 6,688,652 B2 | | 2/2004 | Holmes, IV et al. | 285/105 |

OTHER PUBLICATIONS

Tyler/Union Utilities Minicatalog, Twenty-First Edition, May 2001, title page and p. 3.

\* cited by examiner

*Primary Examiner*—David P. Bryant
*Assistant Examiner*—Alexander P Taousakis
(74) *Attorney, Agent, or Firm*—Charles D. Gunter, Jr.

(57) ABSTRACT

A combination sealing and restraint system for an as-cast ductile iron fitting is shown for both sealing and preventing separation of an iron pipe fitting and a mating male pipe. The restraint system includes both a sealing ring and a combination gripping ring which are installed in a groove provided in a mouth region of the iron fitting. The gripping ring has teeth on an inner surface which are initially angled away from an outer surface of the male pipe. The teeth are forced into engagement with the exterior surface of the mating male pipe as the pipe joint at the fitting is assembled. The teeth are oriented to allow movement of the male pipe in a first direction relative to an end opening of the fitting during assembly, but to resist movement in a opposite direction after the fitting joint has been assembled. The sealing ring and gripping ring are installed in the annular groove of the as-cast iron fitting after the iron casting operation at the factory.

6 Claims, 2 Drawing Sheets

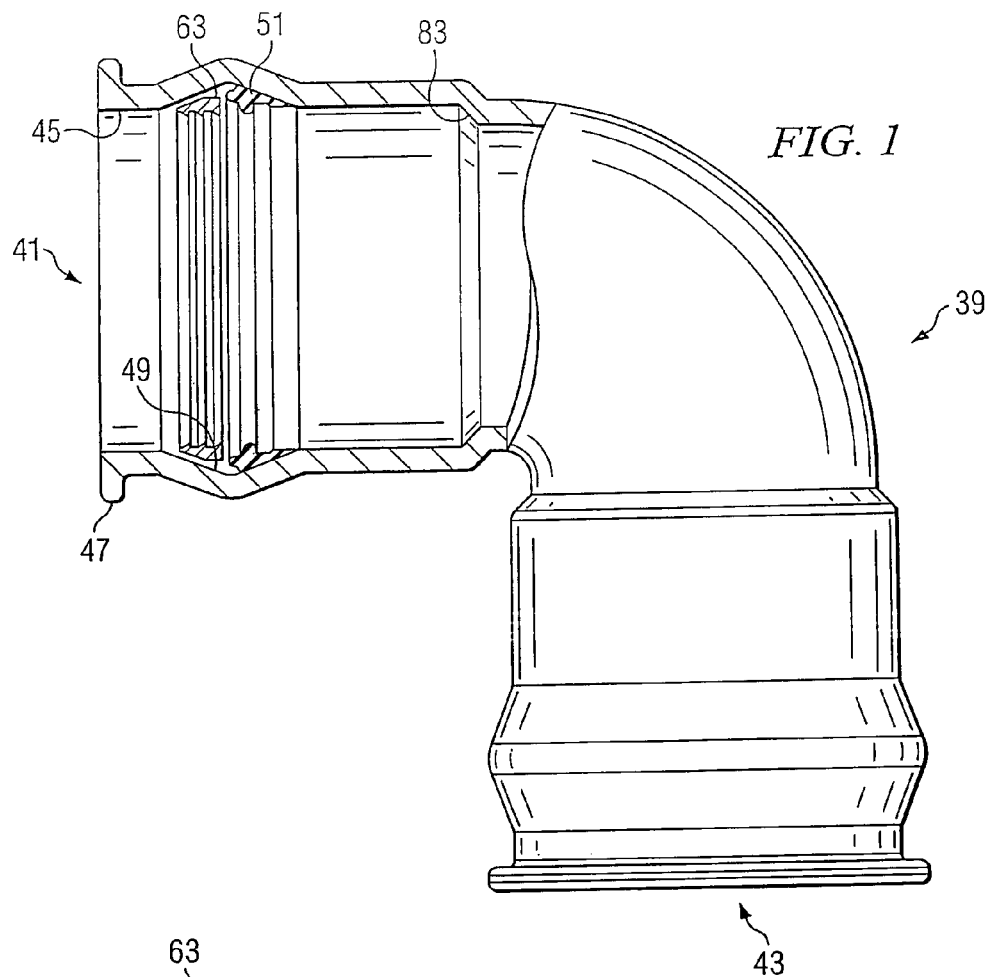
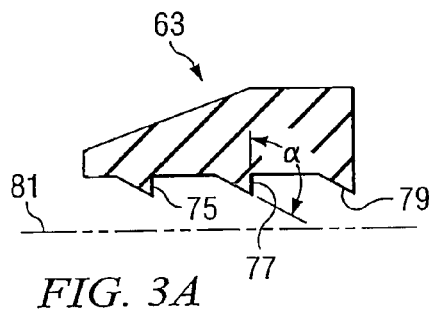
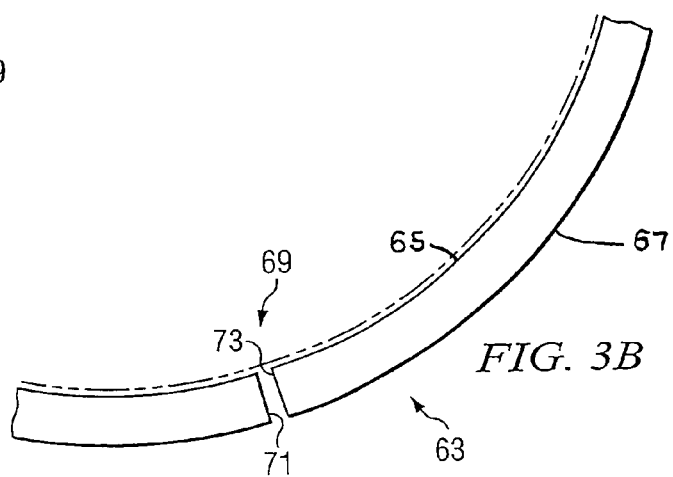
FIG. 1
FIG. 3A
FIG. 3B

SELF RESTRAINED FITTING FOR PVC AND DUCTILE IRON PIPE

CROSS-REFERENCE TO RELATED APPLICATIONS

The present application contains subject matter which is related to Applicant's prior U.S. application, Ser. No. 11/070,554, filed Mar. 2, 2005, entitled "Restraining Mechanical Joint Gasket For Ductile Iron Pipe", by the same inventors, presently pending.

BACKGROUND OF THE INVENTION

1. Field of the Invention

The present invention relates generally to the field of pipe connections and to devices used in the pipeline construction industry. More particularly, this invention relates to a combination sealing and restraint system for use in "as-cast" ductile iron pipe fittings.

2. Description of the Prior Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

In many applications where lengths of pipe are joined in telescoping relationship, the spigot end of one pipe is inserted into the socket end of the engaging pipe at a pipe joint or "coupling." The socket end has an opening large enough to receive the spigot end of the mating pipe. A gasket is typically present within the socket end of the pipe which is intended to prevent leakage of fluid from the joint by forming a seal between the two pipe sections. Piping systems of the above type also typically include "fittings" as that term is defined in the industry. A fitting is a term which will be familiar to those in the relevant industries and includes a piece, often curved or at an angle, as a coupling, an elbow, a valve, a Tee, etc. used for connecting lengths of pipe or as an accessory to a pipe in a piping system for conveying fluids.

One important consideration in piping systems of the above type, whether in a straight run of pipe or at a fitting, is to provide adequate sealing at the pipe joints or couplings. In addition to the necessity of providing effective sealing, another important design requirement exists when it becomes necessary to join the pipe components in a restrained manner. This is usually desired in order to prevent the pipe components from separating due to thrust forces that often occur when the pipeline is subjected to internal or external pressures, changes in direction or elevation of the pipeline, and sometimes when earthquakes or tremors or other external factors come into play.

In the case of existing iron pipelines, the devices for joining pipe have included the use of flanged fittings which are of appropriate diameter and which are fitted onto pipe ends in facing relationship to one another. A sealing gasket is typically employed between the faces of the flanged fittings to obtain a sealed joint. This is usually accomplished by bolting the flanged fittings together. Exemplary "as cast" ductile iron pipe fittings are shown, for example, in the Tyler/Union Utilities Mini-Catalogue, May 2001, on pages 2-3, as the "Mechanical Joint C153 Ductile Iron Compact Fittings." These fittings are merely intended to be exemplary, as there are a number of other commercial sources for such pipe fittings.

A particularly preferred method of forming a sealed joint in the iron pipe industry is sometimes referred to as a "mechanical joint" or simply as an "MJ". The bell end of an iron pipe section has a flanged portion cast on it. The spigot end of a second iron pipe is fitted with a slidable gland fitting and a gasket that is conically shaped such that one face of the gasket is diametrically larger than the second face of the gasket. The conically shaped gasket is positioned between the gland fitting and the spigot end of the pipe with the smaller, second face of the gasket being closer to the spigot end than the larger, first face of the gasket. The gland fitting has a plurality of apertures for receiving standard bolts. The joint is formed when the spigot is axially inserted into the bell, and the gland fitting and the flanged portion are bolted together, causing the lip of the gland fitting to compress the gasket thus sealing the two pipe pieces.

While the "internal" gasket used in the traditional MJ design for ductile iron pipe served to seal the joint, the gasket did not feature a cooperating "restraint" feature in order to assure the greater integrity of the joint of pipe. Instead, it was necessary to utilize a cumbersome external mechanical restraint system made up of the flange, bolts, screws, etc., as discussed above.

A need exists, accordingly, for a sealing and restraint system for ductile iron fittings which offers complimentary sealing and self restraining features in an internal sealing/restraint system.

A need also exists for such a system which is cost-effective, easy to manufacture and easy to use in the field and which is dependable in operation.

A need also exists for such a system which effectively restrains ductile iron fittings against internal and external forces without the need for an external flange, bolts or associated restraining screw mechanisms which are formed of metallic components which would be subject to corrosion in use.

SUMMARY OF THE INVENTION

A combination sealing and restraint system is shown for insertion within an annular groove provided within a mouth region located adjacent an end opening of an as-cast ductile iron fitting. The combination sealing/restraint system is capable of both sealing and restraining the ductile iron fitting to a mating male pipe having an interior surface and an exterior surface which is contacted by the elements of the sealing/restraint system.

The sealing/restraint system includes an annular gasket body made of a resilient elastomeric material which includes an inner circumferential region and an outer circumferential region. The annular gasket body is installed within the annular groove provided in the mouth region of the as-cast fitting so that the outer circumferential region forms a seal with the fitting mouth region and the inner circumferential region forms a sealing surface for the mating male pipe section.

The sealing/restraint system also includes, as a second component, a gripping ring installed within the annular groove provided in the mouth region of the as-cast fitting. The gripping ring has an inner circumferential surface and an outer circumferential surface and having at least one slit at one circumferential location which creates at least one gap, the gap being defined between two opposing faces of the gripping ring when the ring is in a relaxed state. At least one row of teeth are located on the inner circumferential surface of the gripping ring for engaging selected points on the exterior surface of the mating male pipe. The sealing ring and gripping ring are installed within the annular groove in the mouth region of the as-cast ductile iron fitting after manufacture of the fitting.

The mating male pipe can be formed of any number of convenient materials including plastics, such as PVC, polyethylene and other polyolefins, as well as from steel, iron, alloys or other cast ferrous materials. The sealing ring can be a Rieber style sealing gasket of the type normally installed on a belling mandrel and belled over in a plastic pipe bell manufacturing operation. The sealing ring can also be a snap-fit gasket having an embedded reinforcing ring which is not easily bent or flexed by hand and which is initially of a diameter which is generally greater than the diameter of the mouth opening of the as-cast fitting. In the case where the mating male pipe section is formed of iron, the gripping ring is preferably formed of hardened steel which has been heat treated to at least about 370 Brinell hardness (BHN) so that the teeth of the ring can penetrate the mating male iron pipe exterior surface or form a buttress on the pipe surface. Where the mating male pipe is formed of plastic or polyolefin materials, it is not generally necessary to heat treat the gripping ring. The teeth on the gripping ring are oriented so that they allow the mating male pipe to be inserted in the end opening of the as-cast fitting and moved in a first longitudinal direction to make up a secure joint. However, the orientation of the teeth restrains movement of the mating male pipe section in an opposite, longitudinal direction.

In the method of assembling a pipe joint of the invention, a fluid piping system is provided which includes at least one as-cast ductile iron pipe fitting, previously cast at a foundry, having a mouth region adjacent an end opening thereof, the mouth region having an annular groove therein. The end opening of the fitting is sized to receive a mating male pipe having an interior surface and an exterior surface. In a post-casting operation, a sealing ring is installed within the annular groove provided in the end opening of the as-cast fitting, the sealing ring having an annular gasket body made of a resilient elastomeric material. The annular gasket body has an inner circumferential region and an outer circumferential region. The annular gasket body is installed within the annular groove provided in the mouth region of the as-cast fitting so that the outer circumferential region forms a seal with the fitting mouth region and the inner circumferential region forms a sealing surface for a mating male pipe section.

In a further post-casting operation, a gripping ring is installed within the annular groove provided in the mouth region of the as-cast fitting. The gripping ring has an inner circumferential surface and an outer circumferential surface and has at least one slit at one circumferential location which creates at least one gap, the gap being defined between two opposing faces of the gripping ring when the ring is in a relaxed state. The gap allows the ring to be compressed to facilitate installation within the annular groove of the fitting. At least one row of teeth are located on the inner circumferential surface of the gripping ring for engaging selected points on the exterior surface of the mating male pipe.

The mating male pipe is then installed within the end opening of the mouth region of the as-cast fitting, after the installation of the sealing ring and the gripping ring by merely pushing the plain end pipe into the mouth opening of the fitting. The sealing ring and gripping ring contact the external surface of the mating male pipe in order to both seal and restrain the mating male pipe and form a secure pipe joint. It is not necessary to utilize external restraint mechanisms, such as external flanges, collars, restraining bolts, etc.

Additional objects, features and advantages will be apparent in the written description which follows.

BRIEF DESCRIPTION OF THE DRAWINGS

FIG. 1 is a perspective view, partly broken away, of an as-cast ductile iron pipe fitting showing the combination sealing and restraint system of the invention.

FIG. 3A is a side, cross sectional view of the gripping ring of FIG. 2.

FIG. 3B is a top, plan view of the gripping ring of FIG. 3A, showing the circumferential slit in the ring.

DETAILED DESCRIPTION OF THE INVENTION

Figure 2:
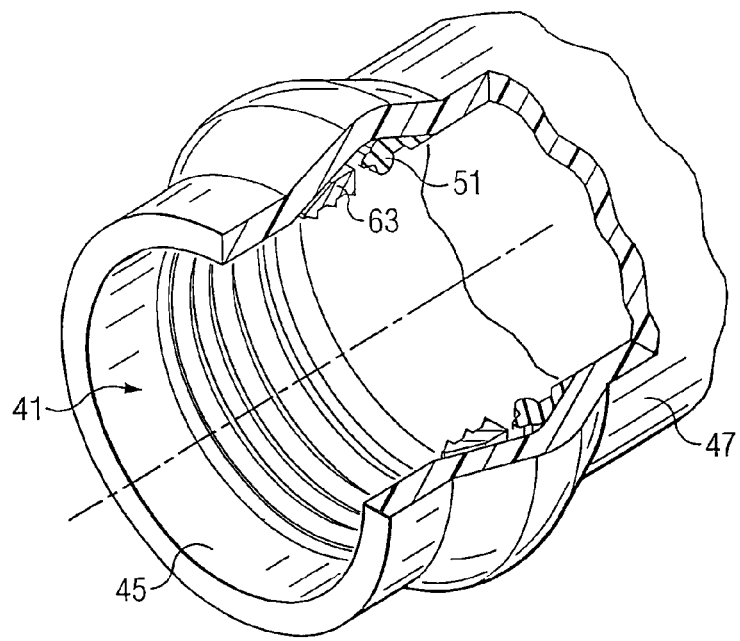
FIG. 2 is a close up view of one end of the ductile iron pipe of FIG. 1 showing the sealing ring and gripping ring thereof in greater detail.

The present invention deals with piping systems of the type used in water, sewage and other municipal fluid conveyance systems. In the past, such pipelines were traditionally formed of a ferrous metal. By "ferrous metal" is meant iron and alloys of iron. For example, one type of ferrous metal which is commonly encountered in the water works industry is "ductile iron." This particular type of metal is widely used because it offers a combination of a wide range of high strength, wear resistance, fatigue resistance, toughness and ductility in addition to the well-known advantages of cast iron-castability, machinability, damping properties and economy of production. It takes its name from the fact that it is "ductile" in nature, rather than being brittle, as was the case with earlier cast iron products and materials. Today, grades of ductile iron are available offering the option of choosing high ductility with grades guaranteeing more than 18% elongation, or high strength, with tensile strengths exceeding 120 ksi (825 MPa). Austempered ductile iron (ADI), offers even greater mechanical properties and wear resistance, providing tensile strengths exceeding 230 ksi (1600 Mpa).

In forming a pipeline of ductile iron components, one end of each section is typically enlarged, forming a "bell" at one end sufficient to join the next adjacent pipe section by receiving in the belled end the unenlarged or "spigot" end of the next adjacent length of pipe within the bell end opening. The inside diameter of the bell is formed sufficiently large to receive the spigot of the next section of pipe with sufficient clearance to allow the application of an elastomeric gasket or other sealing device designed to prevent leakage at pipe joints when a plurality of pipe lengths are joined to form a pipeline.

Ductile iron piping components of the above type have, for many years, been joined by utilizing an elastomeric gasket which is compressed between the inside walls of the bell and the outside wall of the plane or beveled end of the spigot end of the next pipe in a series of telescoped pipes. The gasket is typically retained within the groove provided in the bell end opening of the female pipe section. However, as discussed above, one problem which exists is finding a way to "restrain" the assembled pipe joints so that the joint will not be separated due to internal or external pressure, or due to environmental factors such as earth movement.

As mentioned in the background discussion of the invention, the iron pipe industry has addressed the problem of providing a restrained pipe joint by utilizing a sealing "gland" or flange, sometimes referred to as a "mechanical joint" or simply as an "MJ". The bell end of an iron pipe section has a flanged portion cast on it. The spigot end of a second iron pipe is fitted with a slidable gland and a gasket that is conically shaped. The conically shaped gasket is positioned between the gland fitting and the spigot end of the pipe. The gland fitting has a plurality of apertures for receiving standard bolts. The joint is formed when the spigot is axially inserted into the bell, and the gland fitting and the flanged portion are bolted together, causing the lip of the gland to compress the gasket, thus sealing the two sections of pipe.

Figure 5:
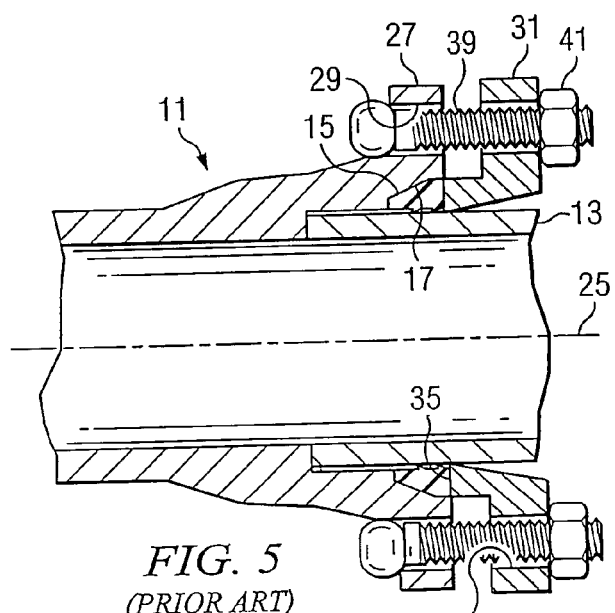
FIG. 5 is a side, cross sectional view of a prior art "MJ" mechanical joint of the type used to join lengths of iron pipe.

Turning to FIG. 5, there is shown a typical mechanical joint of the prior art. The joint shown in FIG. 5 is formed between a pipe bell end 11 of one ductile iron pipe and the plain spigot end 13 of a second ductile iron pipe. The second pipe 13 is inserted into the belled end 11 of the enclosing pipe. The inner surface of the pipe bell end 11 has a retainer groove 17 for retaining a gasket 15. The belled pipe end 11 also has a flanged region 27 which includes a plurality of apertures 29. A circumferential gland 31 is sized to be received about an outer surface of the mating male ductile iron pipe. The gland 33 has a forward lip portion 35 which contacts and compresses the body of the gasket 15 as the joint is assembled. The gland 31 also has a plurality of apertures 37 which are arranged to be aligned with the apertures in the flange collar region of the bell pipe end. Bolts 39 and nuts 41 are used to join the apertures of the bell pipe end and the gland as shown in FIG. 5.

While the mechanical joint illustrated in FIG. 5 has been utilized for a number of years in the industry, it is somewhat cumbersome and time consuming to assemble. Additionally, the external metallic components are subject to wear, damage and corrosion. Applicants co-pending application Ser. No. 11/070,554, filed Mar. 2, 2005, entitled "Restraining Mechanical Joint Gasket for Ductile Iron Pipe", by the same inventors, presents an improved combination sealing and restraint mechanism to replace the traditional mechanical joint illustrated in FIG. 5. The present invention is an extension of the before mentioned technology to as-cast "fittings" which are used to make up a joint between two plain end pipe sections. As-cast fittings of the type under consideration are commercially available from a number of sources, for example, the Tyler Pipe/Utilities Division of Union Foundry Company located in Anniston, Alabama, as previously mentioned in the Background discussion.

FIG. 1 illustrates as-cast ductile iron elbow fitting which has been modified in accordance with the teachings of the present invention. The as-cast fitting 39 illustrated in FIG. 1 has opposing end openings 41, 43. Each end opening has an adjacent mouth region (45 in FIG. 1) and can be provided with a slight upset 47. It is not necessary that the upset 47 be provided as an apertured flange, however.

An annular groove 49 is provided within the mouth region 45 slightly spaced back from the end opening 41. In some cases, it may not be necessary to modify the existing casting which typically has an annular groove 49. In other cases, for purposes of the present invention, it may be necessary to lengthen or enlarge the annular groove 49.

Figure 4A:
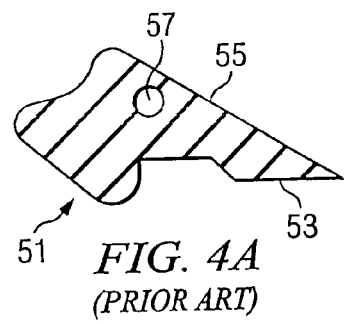
FIG. 4A-4C are side, cross sectional views of three different prior art sealing rings manufactured by Applicant of the type which could be used in the restraint system of the invention.

As shown in FIG. 1, the combination sealing and restraint system of the invention includes an annular gasket body 51 having an inner circumferential region 53 and outer circumferential region 55 (see FIG. 4A). The annular gasket body 51 is installed within the annular groove 49 provided in the mouth region 45 of the as-cast fitting so that the outer circumferential region 55 forms a seal with the fitting mouth region and the inner circumferential region 53 forms a sealing surface for a mating male pipe section.

Figure 4B:
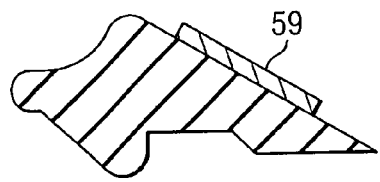
Figure 4C:
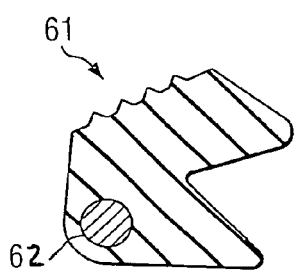

FIGS. 4A-4C illustrate several typical gasket designs which may be utilized in the practice of the present invention. FIGS. 4A and 4B illustrate typical prior art "Rieber" style gaskets each of which includes a body formed of an elastomeric material such as a suitable natural or synthetic rubber. The gasket shown in FIG. 4A is reinforced by means of a circumferential metal ring 57 while the gasket of FIG. 4B is reenforced by means of an external metal band 59. Gaskets of the above type are commercially available from S&B Technical Products, Inc., of Fort Worth, Tex., the assignee of the present invention.

While the gaskets illustrated in FIGS. 4A and 4B have existed in the prior art, they were typically utilized in a "Rieber" sealing system for plastic pipe. This technology was developed in the early 1970's by Rieber & Son of Bergen, Norway and provided an integral sealing mechanism within the bell or female pipe end for sealing with the spigot end of a mating plastic pipe. In the Rieber process, the elastomeric gasket was placed on a forming mandrel and a heated thermoplastic pipe end was formed over the mandrel and gasket. This provided a prestressed and anchored gasket within the simultaneously formed internal groove of the belled pipe end and provided a sealing gasket which would not twist or flip or otherwise allow impurities to enter the sealing zone of the ultimately formed pipe joint. The Rieber process is described in the following issued U.S. patents, among others: U.S. Pat. Nos. 4,120,531; 4,061,459; 4,030,872; 3,965,715; 3,929,958; 3,887,992; 3,884,612; and 3,776,682. While the Rieber process provided an improved sealing system for plastic pipelines, it did not include any integral restraint type mechanism. In the application of the invention illustrated in FIG. 1, the Rieber style gasket is flexed and forced into position within the internal groove 49 of the as-cast iron fitting, rather than within the belled end of a plastic pipe.

FIG. 4C illustrates another style prior art gasket which could be utilized with the present invented method. The gasket 61 illustrated in FIG. 4C includes an embedded reinforcing ring 62. The size and position of the embedded ring within the gasket body is generally greater than the diameter of the mouth opening of the associated belled pipe end into which it is inserted. U.S. Pat. No. 6,044,539, issued Apr. 4, 2000, to Guzowski, and commonly owned by the present applicant describes a machine for inserting a snap-fit gasket of this type having an embedded reinforcing ring into a pre-formed gasket receiving groove in a belled pipe end of a plastic pipeline. However, the snap-fit gasket did not include a companion restraint system of the type envisioned in the present invention.

The combination sealing and restraint system of the invention also includes a gripping ring 63 (FIG. 1) which is installed within the annular groove 49 provided in the mouth region 45 of the as-cast fitting 39. The gripping ring 63 as shown in FIG. 3B, can be a simple metal ring having an inner circumferential surface 65 and an outer circumferential surface 67. As shown in FIG. 3B, the gripping ring 63 also has at least one slit at one circumferential location which creates a gap 69, the gap being defined between the opposing faces 71, 73 of the gripping ring when the ring is in the relaxed state. The single piece ring 63 illustrated in FIGS.

3A and 3B is preferably formed of a steel or a similar hardened metal which has been heat treated to at least about 370 Brinnell hardness (BHN) so that the teeth of the ring can penetrate the spigot pipe exterior surface or form a buttress on the pipe surface where the mating pipe is formed of iron. In cases where the mating pipe is formed of a softer material such as plastic, it is not generally necessary to heat treat the ring or the teeth of the ring. While the preferred material for the ring 63 is steel, it will be understood that the ring could be formed of any suitable hard material such as cast iron or metal alloys such as copper, aluminum or stainless steel as well as various hardened polymers, ceramics, composite materials and the like. In addition to facilitating assembly of the ring within the annular groove, the overall gap 69 formed at one circumferential location within the ring allows the ring 63 to slip over the mating male pipe end during assembly of the pipe joint. The opposing faces 71,73 are initially spaced apart by a predetermined distance which will vary based upon, e.g., the diameter of the mating male pipe.

As shown in FIG. 3A, the ring 63 has at least one and preferably a plurality of circumferential rows of gripping teeth, in this case, rows 75, 77, 79. As illustrated in FIG. 3A, the teeth are formed on an acute angle "α" with respect to a horizontal axis 81 of the mouth opening 45 once assembled within the as-cast fitting 39. The shape and inclined angle of the teeth allow a mating male pipe end to be received within the end opening 41 of the fitting 39 and move in a direction from left to right as viewed in FIG. 1 but to resist opposite relative movement and thereby exert a restraining force on the mating male pipe.

The operation of the sealing and restraint system of the invention will now be briefly described. With reference to FIG. 1, the as-cast fitting 39 requires little if any modification from the item typically produced as-cast from the foundry. As mentioned earlier, it is not necessary for the upset 47 to be provided with apertures for receiving connecting bolts since the internal restraint system of the invention replaces the prior art external components. The sealing ring 51 is then typically installed within the internal groove 49 provided within the mouth region 45 of the fitting. The sealing gasket can assume any of a number of forms or shapes and may include either the previously described "Rieber" sealing gasket or a "snap-fit" style gasket or a gasket of other convenient design. The gripping ring 63 is then typically installed within the annular groove adjacent and typically in contact with the sealing ring 51 by merely compressing the ring gap 69 and allowing the ring to snap into place within the groove 49. While the preferred embodiment illustrated in FIG. 1 utilizes separate sealing and gripping components, it will also be understood that the components could be joined as with a suitable glue or adhesive or by molding the gripping ring partly or wholly within the body of the sealing gasket 51. To make up the ultimate pipe joint, it is necessary only that the mating male pipe end be inserted within the end opening 41 of the fitting 39 and pushed into position. For example, the mating male pipe might be pushed until it contacts the internal shoulder 83 illustrated in FIG. 1. Any forces tending to dislodge the mating male pipe are opposed by the gripping teeth 75, 77, 79 on the inner circumferential surface 65 of the gripping ring 63.

An invention has been provided with several advantages. The combination sealing and restraint system of the invention is capable of joining and sealing an as-cast ductile iron fitting to a mating male pipe section. The system of the invention is simple in design and economical to manufacture and does not require any drastic changes in existing ductile iron components. The present invention can be used to join ductile iron fittings to mating pipe sections without the need for external mechanical restrain components which complicate assembly and can be subject to corrosion or deterioration in use.

While the invention has been shown in only one of its forms, it is not thus limited but is susceptible to various changes and modifications without departing from the spirit thereof.

I claim:

1. A method of forming a pipe joint, the method comprising the steps of:
   providing a fluid piping system including at least one as-cast ductile iron pipe fitting, previously cast at a foundry, having a mouth region adjacent an end opening thereof, the mouth region having an annular groove therein, the end opening of the fitting being sized to receive a mating male pipe having an interior surface and an exterior surface;
   in a post-casting operation, installing a sealing ring within the annular groove provided in the end opening of the as-cast fitting, the sealing ring having an annular gasket body made of a resilient elastomeric material, the annular gasket body having an inner circumferential region and an outer circumferential region, the annular gasket body being installed within the annular groove provided in the mouth region of the as-cast fitting so that the outer circumferential region forms a seal with the fitting mouth region and the inner circumferential region forms a sealing surface for a mating male pipe section;
   in a further post-casting operation, installing a separate gripping ring within the same annular groove provided in the mouth region of the as-cast fitting, the gripping ring being installed in front of and in contact with the sealing ring, the gripping ring having an inner circumferential surface and an outer circumferential surface and having at least one slit at one circumferential location which creates at least one gap, the gap being defined between two opposing faces of the gripping ring when the ring is in a relaxed state;
   wherein at least one row of teeth are located on the inner circumferential surface of the gripping ring for engaging selected points on the exterior surface of the mating male pipe;
   thereafter installing a mating male pipe within the end opening of the mouth region of the as-cast fitting by pushing the male pipe within the end opening, the sealing ring inner circumferential region and gripping ring inner circumferential surface contacting the external surface of the mating male pipe in order to both seal and restrain the mating male pipe and form a secure pipe joint, the sealing ring also contacting and thereby energizing the gripping ring as the mating male pine section moves within the end opening of the mouth region of the fitting.

2. The method of claim 1, wherein the mating male pipe is made form a plastic material.

3. The method of claim 1, wherein the mating male pipe is also made from iron.

4. The method of claim 1, wherein the sealing ring is a Rieber style sealing gasket of the type normally installed on a belling mandrel and belled over in a plastic pipe bell manufacturing operation.

5. The method of claim 1, wherein the sealing gasket which is used is a snap-fit gasket having an embedded reinforcing ring which is not easily bent or flexed by hand and which is of a diameter which is generally greater than the diameter of the mouth opening of the as-cast fitting.

6. The method of claim 1, wherein the mating male pipe is formed of iron and wherein the gripping ring is formed of hardened steel which has been heat treated to at least 370 Brinell hardness (BHN) so that the teeth of the ring can penetrate the mating male iron pipe exterior surface to form a buttress on the pipe surface.

* * * * *